United States Patent
Guo

(10) Patent No.: US 12,507,990 B2
(45) Date of Patent: Dec. 30, 2025

(54) ULTRASONIC IMAGING METHOD, ULTRASONIC IMAGING APPARATUS AND STORAGE MEDIUM

(71) Applicant: SHENZHEN MINDRAY BIO-MEDICAL ELECTRONICS CO., LTD., Guangdong (CN)

(72) Inventor: Chongchong Guo, Shenzhen (CN)

(73) Assignee: Shenzhen Mindray Bio-Medical Electronics Co., Ltd., Shenzhen (CN)

( * ) Notice: Subject to any disclaimer, the term of this patent is extended or adjusted under 35 U.S.C. 154(b) by 87 days.

(21) Appl. No.: 18/190,360

(22) Filed: Mar. 27, 2023

(65) Prior Publication Data
US 2023/0301625 A1    Sep. 28, 2023

(30) Foreign Application Priority Data
Mar. 25, 2022 (CN) .......................... 202210307785.1

(51) Int. Cl.
*A61B 8/00* (2006.01)

(52) U.S. Cl.
CPC .............. *A61B 8/44* (2013.01); *A61B 8/463* (2013.01); *A61B 8/52* (2013.01)

(58) Field of Classification Search
CPC .. A61B 8/44; A61B 8/463; A61B 8/52; A61B 8/5207; A61B 8/54; G10K 11/343; G10K 11/346; G01S 15/8915; G01S 15/8977; G01S 7/52046; G01S 7/52085; G01S 7/52098
See application file for complete search history.

(56) References Cited

U.S. PATENT DOCUMENTS

| | | | |
|---|---|---|---|
| 2019/0365345 A1* | 12/2019 | Byram | G06T 7/0012 |
| 2021/0128114 A1* | 5/2021 | Patil | A61B 8/54 |
| 2021/0132223 A1* | 5/2021 | Hennersperger | G01S 7/52049 |
| 2021/0174496 A1* | 6/2021 | Annangi | A61B 8/5223 |

* cited by examiner

*Primary Examiner* — Brooke Lyn Klein
(74) *Attorney, Agent, or Firm* — Sheppard Mullin Richter & Hampton LLP

(57) ABSTRACT

An ultrasonic imaging method includes: detecting an imaging setting for current ultrasonic imaging before ultrasonic imaging; determining a beam forming procedure corresponding to the imaging setting from a plurality of predetermined beam forming procedures; controlling an ultrasonic probe to transmit ultrasonic waves to a biological tissue under examination based on the imaging setting and obtain echo signals from the biological tissue under examination; beam-forming the echo signals by the determined beam forming procedure to generate beam-formed data; generating an ultrasonic image of the biological tissue under examination based on the beam-formed data.

10 Claims, 6 Drawing Sheets

ULTRASONIC IMAGING METHOD, ULTRASONIC IMAGING APPARATUS AND STORAGE MEDIUM

CROSS-REFERENCE TO RELATED APPLICATIONS

This application is based on and claims priority to and benefits of Chinese Patent Application No. 202210307785.1, filed on Mar. 25, 2022. The entire content of the above-referenced application is incorporated herein by reference.

TECHNICAL FIELD

The present disclosure relates to ultrasonic imaging, and in particular to ultrasonic imaging methods, ultrasonic imaging apparatus and storage media.

BACKGROUND

Ultrasonic imaging has been widely used in clinical diagnosis and routine health examination, and has irreplaceable advantages over other typical imaging techniques such as computed tomography imaging, magnetic resonance imaging, etc. In ultrasonic imaging, beam forming is a key link that affects image performance. In order to improve image quality, the industry has developed a variety of beam forming methods, which have their own characteristics and can give full play to their advantages in some specific application scenarios in clinical application. In other words, a single beam forming method cannot achieve the optimal image effect in all clinical application scenarios. Therefore, how to determine a more appropriate beam forming method according to the actual needs in clinical practice to obtain a satisfactory image effect is one of the problems to be solved or improved in the field of ultrasonic imaging.

SUMMARY

An ultrasonic imaging method provided in an embodiment may include:
- obtaining an imaging setting for current ultrasonic imaging, the imaging setting comprising at least one of ultrasonic probe type, probe scan mode, type of biological tissue under examination, and imaging parameter for ultrasonic imaging;
- determining a beam forming procedure corresponding to the imaging setting from a plurality of predetermined beam forming procedures according to the imaging setting;
- controlling an ultrasonic probe to transmit ultrasonic waves to a biological tissue under examination according to the imaging setting and obtain echo signals from the biological tissue under examination;
- beam-forming the echo signals by the determined beam forming procedure to generate beam-formed data; and
- generating an ultrasonic image of the biological tissue under examination based on the beam-formed data.

In an embodiment, the plurality of predetermined beam forming procedures may comprise at least two of a delay and sum (DAS) beam forming procedure, a minimum variance (MV) beam forming procedure, a coherent factor beam forming procedure, an incoherent beam forming procedure, and a frequency domain beam forming procedure.

In an embodiment, the imaging setting comprises type of biological tissue under examination, and said determining a beam forming procedure corresponding to the imaging setting from a plurality of predetermined beam forming procedures according to the imaging setting may comprise:
- determining the minimum variance (MV) beam forming procedure as the beam forming procedure corresponding to the imaging setting when the type of biological tissue under examination is a small organ or a thin tissue; or
- determining the coherent factor beam forming procedure as the beam forming procedure corresponding to the imaging setting when the type of biological tissue under examination is a well-defined boundary organ; or
- determining the incoherent beam forming procedure as the beam forming procedure corresponding to the imaging setting when the type of biological tissue under examination is a uniform organ tissue; or
- determining the delay and sum (DAS) beam forming procedure as the beam forming procedure corresponding to the imaging setting when the type of biological tissue under examination is a complex structure tissue; or
- determining the frequency domain beam forming procedure as the beam forming procedure corresponding to the imaging setting when the type of biological tissue under examination is a fast moving tissue.

In an embodiment, the imaging setting may include ultrasonic probe type, and said determining a beam forming procedure corresponding to the imaging setting from a plurality of predetermined beam forming procedures according to the imaging setting may include:
- determining the minimum variance (MV) beam forming procedure as the beam forming procedure corresponding to the imaging setting when the ultrasonic probe type is a high-frequency probe; or
- determining the frequency domain beam forming procedure as the beam forming procedure corresponding to the imaging setting when the ultrasonic probe type is a phased array probe, a volume probe or a two-dimensional matrix probe; or
- determining the coherent factor beam forming procedure, the incoherent beam forming procedure or the delay and sum (DAS) beam forming procedure as the beam forming procedure corresponding to the imaging setting when the ultrasonic probe type is a conventional linear array probe or a conventional convex array probe.

In an embodiment, the imaging setting may include probe scan mode, and said determining a beam forming procedure corresponding to the imaging setting from a plurality of predetermined beam forming procedures according to the imaging setting may include:
- determining the minimum variance (MV) beam forming procedure as the beam forming procedure corresponding to the imaging setting when the probe scan mode is a linear scan mode; or
- determining the incoherent beam forming procedure as the beam forming procedure corresponding to the imaging setting when the probe scan mode is a sector scan mode; or
- determining the delay and sum (DAS) beam forming procedure as the beam forming procedure corresponding to the imaging setting when the probe scan mode is an extended scan mode; or
- determining the frequency domain beam forming procedure as the beam forming procedure corresponding to the imaging setting when the probe scan mode is a volume scan mode.

In an embodiment, the imaging setting may include imaging parameter for ultrasonic imaging, and said determining a beam forming procedure corresponding to the imaging setting from a plurality of predetermined beam forming procedures according to the imaging setting may include:
  determining the minimum variance (MV) beam forming procedure as the beam forming procedure corresponding to the imaging setting when the imaging parameter is a small imaging depth or a high ultrasonic frequency; or
  determining the coherent factor beam forming procedure as the beam forming procedure corresponding to the imaging setting when the imaging parameter is a high gain or a low ultrasonic frequency; or
  determining the incoherent beam forming procedure as the beam forming procedure corresponding to the imaging setting when the imaging parameter is a high line density or a high number of transmissions; or
  determining the delay and sum (DAS) beam forming procedure as the beam forming procedure corresponding to the imaging setting when the imaging parameter is a middle ultrasonic frequency; or
  determining the frequency domain beam forming procedure as the beam forming procedure corresponding to the imaging setting when the imaging parameter is a large imaging depth or a high frame rate.

In an embodiment, said obtaining an imaging setting for current ultrasonic imaging may include: determining the imaging setting for current imaging setting based on a received user input.

In an embodiment, the method may further include:
  obtaining an adjusted imaging setting for current ultrasonic imaging;
  determining a beam forming procedure corresponding to the adjusted imaging setting from the plurality of predetermined beam forming procedures based on the adjusted imaging setting;
  controlling the ultrasonic probe to transmit ultrasonic waves to the biological tissue under examination based on the adjusted imaging setting and obtain echo signals from the biological tissue under examination;
  beam-forming the echo signals by the determined beam forming procedure corresponding to the adjusted imaging setting to generate beam-formed data; and
  generating an ultrasonic image of the biological tissue under examination based on the beam-formed data.

In an embodiment, the method may further include:
  obtaining an adjusted imaging setting for current ultrasonic imaging; and
  determining whether the adjusted imaging setting meets a first predetermined condition, and switching a currently used beam forming procedure to the beam forming procedure corresponding to the adjusted imaging setting when the adjusted imaging setting meets the first predetermined condition.

In an embodiment, the first predetermined condition may include: a change value of the adjusted imaging setting relative to a pre-adjusted imaging setting being greater than a predetermined threshold.

In an embodiment, the method may further include:
  obtaining an adjusted imaging setting for current ultrasonic imaging; and
  determining whether the adjusted imaging setting meets a second predetermined condition, and remaining a currently used beam forming procedure unchanged when the adjusted imaging setting meets the second predetermined condition.

In an embodiment, the second predetermined condition may include: the adjusted imaging setting being an imaging setting of a predetermined type.

An ultrasonic imaging method provided in an embodiment may include:
  controlling an ultrasonic probe to transmit a first ultrasonic wave to a biological tissue under examination and obtain first echo signals from the biological tissue under examination;
  beam-forming the first echo signals by a first beam forming procedure;
  generating a first ultrasonic image of the biological tissue under examination based on beam-formed data obtained by the first beam forming procedure;
  determining a second beam forming procedure from a plurality of predetermined beam forming procedures based on the first ultrasonic image;
  controlling the ultrasonic probe to transmit a second ultrasonic wave to the biological tissue under examination and obtain second echo signals from the biological tissue under examination;
  beam-forming the second echo signals by the determined second beam forming procedure; and
  generating a second ultrasonic image of the biological tissue under examination based on beam-formed data obtained by the second beam forming procedure.

In an embodiment, said determining a second beam forming procedure from a plurality of predetermined beam forming procedures based on the first ultrasonic image may include: obtaining tissue information contained in the first ultrasonic image, and determining the second beam forming procedure from the plurality of predetermined beam forming procedures according to the tissue information.

In an embodiment, the plurality of predetermined beam forming procedures may include at least two of delay and sum (DAS) beam forming procedure, minimum variance (MV) beam forming procedure, and coherent factor beam forming procedure.

In an embodiment, said determining a second beam forming procedure from a plurality of predetermined beam forming procedures based on the first ultrasonic image may include:
  calculating a first proportion of large structure information and tissue boundary of the first ultrasound image in the first ultrasound image;
  calculating a second proportion of small structure information of the first ultrasonic image in the first ultrasonic image; and
  determining the beam forming procedure using coherence as the second beam forming procedure when the first proportion is greater than the second proportion and greater than a predetermined proportion threshold; or determining the minimum variance (MV) beam forming procedure as the second beam forming procedure when the first proportion is smaller than the second proportion and greater than the predetermined proportion threshold; or determining the delay and sum (DAS) beam forming procedure as the second beam forming procedure when the first proportion and the second proportion are smaller than or equal to the predetermined proportion threshold or when the first proportion is equal to the second proportion.

An ultrasonic imaging method provided in an embodiment may include:

controlling an ultrasonic probe to transmit a first transmitting ultrasonic wave to a biological tissue under examination based on an imaging setting for current ultrasonic imaging and obtain first echo signals from the biological tissue under examination;

beam-forming the first echo signals with a first beam forming procedure;

generating a first ultrasonic image of the biological tissue under examination based on beam-formed data obtained by the first beam forming procedure;

obtaining an adjusted imaging setting for current ultrasonic imaging;

determining a second beam forming procedure corresponding to the adjusted imaging setting from a plurality of predetermined beam forming procedures based on the adjusted imaging setting;

controlling the ultrasonic probe to transmit a second ultrasonic wave to the biological tissue under examination based on the adjusted imaging setting and obtain second echo signals from the biological tissue under examination;

beam-forming the second echo signals by the determined second beam forming procedure; and generating a second ultrasonic image of the biological tissue under examination based on beam-formed data obtained by the second beam forming procedure.

In an embodiment, the imaging settings may include at least one of ultrasonic probe type, probe scan mode, type of biological tissue under examination, and imaging parameter for ultrasonic imaging.

An ultrasonic imaging method provided in an embodiment may include:

displaying a plurality of beam forming selection items on a display interface, each beam forming selection item being associated with at least one beam forming procedure;

detecting a selection instruction generated based on a user's selection operation on the beam forming selection items;

determining a beam forming procedure based on the selection instruction;

controlling an ultrasonic probe to transmit an ultrasonic wave to a biological tissue under examination and obtain echo signals from the biological tissue under examination;

beam-forming the echo signals by the determined beam forming procedure to obtain beam-formed data; and generating an ultrasound image of the biological tissue under examination based on the beam-formed data.

An ultrasonic imaging apparatus provided in an embodiment may include:

an ultrasonic probe configured to transmit an ultrasonic wave to a biological tissue under examination based on an imaging setting for ultrasonic imaging and obtain echo signals from the biological tissue under examination;

a beam former configured to perform a beam forming on the echo signals by a beam forming procedure to generate beam-formed data; and a processor configured to control the ultrasonic probe and the beam former to perform the ultrasonic imaging method according to any one of the claims.

A computer-readable storage medium having stored thereon a program that can be executed by a processor to implement any one of the methods mentioned above in an embodiment.

The ultrasonic imaging apparatus in the aforesaid embodiment is pre-provided with a plurality of beam forming procedures, and with a variety of ways to select an appropriate beam forming procedure, including at least the following:

(1) according to a current imaging setting obtained after it has been configured by a user, selecting an appropriate beam forming procedure by the ultrasonic imaging apparatus from the plurality of beam forming procedure to generate an ultrasonic image;

(2) according to a current imaging setting obtained after it has been configured by a user, displaying at least one beam forming procedure related to the imaging setting, thereby providing the user with a selection access to the beam forming procedure according to the user's own experience or needs; and (3) firstly performing beam forming by a default or user-selected first beam forming procedure in ultrasonic imaging to generate the first ultrasonic image based on the beam-formed data obtained by the first beam forming procedure, then recognizing tissue information in the first ultrasonic image, and determining an appropriate second beam forming procedure from the beam forming procedures based on the tissue information so as to regenerate a second ultrasonic image.

Furthermore, during ultrasonic imaging, when the ultrasonic imaging apparatus detects that the imaging setting has been adjusted by the user, it is also possible to change the selected beam forming procedure based on the change of the imaging setting, so that the beam forming procedure adopted in ultrasonic imaging can be well adapted to different use scenarios and/or requirements so as to achieve a better ultrasonic imaging effect.

DETAILED DESCRIPTION

Figure 1:
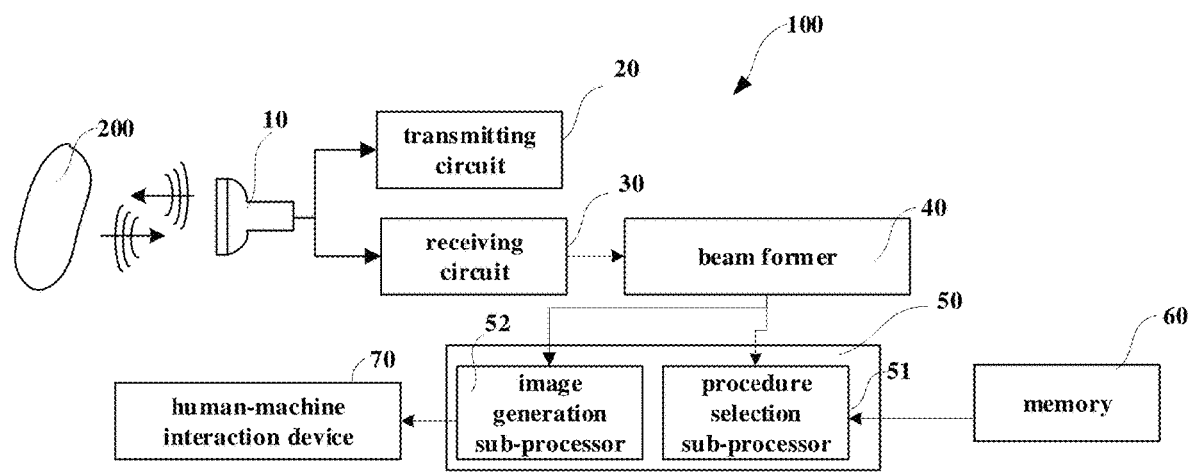
FIG. 1 is a schematic diagram of an ultrasonic imaging apparatus according to an embodiment.

The present disclosure will be further described in detail below through specific embodiments with reference to the accompanying drawings. Common or similar elements are referenced with like or identical reference numerals in different embodiments. Many details described in the following embodiments are for better understanding the present disclosure. However, those skilled in the art can realize with minimal effort that some of these features can be omitted in different cases or be replaced by other elements, materials and methods. For clarity some operations related to the present disclosure are not shown or illustrated herein so as to prevent the core from being overwhelmed by excessive descriptions. For those skilled in the art, such operations are not necessary to be explained in detail, and they can fully understand the related operations according to the description in the specification and the general technical knowledge in the art.

In addition, the features, operations or characteristics described in the specification may be combined in any suitable manner to form various embodiments. At the same time, the steps or actions in the described method can also be sequentially changed or adjusted in a manner that can be apparent to those skilled in the art. Therefore, the various sequences in the specification and the drawings are only for the purpose of describing a particular embodiment, and are not intended to be an order of necessity, unless otherwise stated one of the sequences must be followed.

The serial numbers of components herein, such as "first", "second", etc., are only used to distinguish the described objects and do not have any order or technical meaning. The terms "connected", "coupled" and the like here include direct and indirect connections (coupling) unless otherwise specified.

The most important idea of the present disclosure is to predetermine a plurality of beam forming procedures so that an appropriate beam forming procedure can be automatically selected according to an imaging setting in ultrasonic imaging, also the beam forming procedure can be selected according to experience, and that the ultrasonic imaging method can be altered according to the adjustment of the imaging setting or an obtained tissue information.

Referring to FIG. 1, there is provided an ultrasonic imaging apparatus 100 comprising an ultrasonic probe 10, a transmitting circuit 20, a receiving circuit 30, a beam former 40, a processor 50, a memory 60 and a human-computer interaction device 70.

The ultrasonic probe 10 may include a transducer (not shown in the figure) composed of a plurality of array elements, which are arranged into a row to form a linear array or a two-dimensional matrix to form a planar array. The plurality of array elements may also form a convex array. The array elements (for example using piezoelectric crystals) may convert electrical signals into ultrasonic signals in accordance with a transmission sequence transmitted by the transmitting circuit 20. The ultrasonic signals may, depending on applications, include one or more scanning pulses, one or more reference pulses, one or more impulse pulses and/or one or more Doppler pulses. According to the pattern of waves, the ultrasonic signals may include a focused wave, a plane wave and a divergent wave. The array elements may be configured to transmit an ultrasonic beam according to an excitation electrical signal or convert a received ultrasonic beam into an electrical signal. Each array element can accordingly be configured to achieve a mutual conversion between an electrical pulse signal and an ultrasonic beam, thereby achieving the transmission of ultrasonic waves to a biological tissue under examination 200, and can also be configured to receive ultrasonic echo signals reflected back by the tissue. During ultrasonic detection, the transmitting circuit 20 and the receiving circuit 30 can be used to control which array elements are used for transmitting the ultrasonic beam (referred to as transmitting array elements), which array elements are used for receiving the ultrasonic beam (referred to as receiving array elements), or to control the array elements to be used for transmitting the ultrasonic beam or receiving echoes of the ultrasonic beam in time slots. The array elements involved in transmission of ultrasonic waves can be excited by electric signals at the same time, so as to emit ultrasonic waves simultaneously; alternatively, the array element involved in transmission of ultrasonic waves can also be excited by a number of electric signals with a certain time interval, so as to continuously emit ultrasonic waves with a certain time interval. If the minimum processing area for receiving and reflecting ultrasonic waves in the biological tissue under examination 200 is referred to as a location point within the tissue, after reaching each location point of the biological tissue under examination 200, the ultrasonic waves may generate different reflections due to the different acoustic impedance of the tissue at different location points; then the reflected ultrasonic waves may be picked up by the receiving array elements, and each receiving array element may receive ultrasonic echoes of a plurality of location points. The ultrasonic echoes of different location points received by each receiving array element may form different channel data; and multiple channel data output by each receiving array element may form a set of channel data corresponding to the receiving array element. For a certain receiving array element, the distance from the receiving array element to different location points of the biological tissue under examination 200 is different, so the time when the ultrasonic echoes reflected by each location point reach the array element is also different; accordingly, a the corresponding relationship between the ultrasonic echoes and the location point can be identified according to the time when the ultrasonic echoes reach the array element.

As used herein, "channel data" may refer to data corresponding to a channel of the ultrasonic imaging apparatus (corresponding to one or more array elements) prior to beam forming processing. For example, it can be either a radio frequency signal before demodulation, or a baseband signal after demodulation, and so on.

The transmitting circuit 20 may be configured to, depending on the control of the processor 50, generate the transmission sequence which may be configured to control some or all of the plurality of array elements to transmit ultrasonic waves to the biological tissue. Parameters of the transmission sequence may include the position(s) of transmitting array element(s), the number of the array elements, and the transmission parameter(s) of the ultrasonic beam (such as amplitude, frequency, number of transmissions, transmission interval, transmission angle, wave pattern, focus position, etc.). In some cases, the transmitting circuit 20 may also be configured to phase delay the transmitted beam so that different transmitting array elements transmit at different times, thereby each transmitting ultrasonic beam can be focused in a predetermined area. Due to different operating modes, such as B-image mode, C-image mode and D-image mode (Doppler mode), the parameters of the transmission sequence may be various.

The receiving circuit 30 may be configured to receive ultrasonic echo signals from the ultrasonic probe 10 and process the ultrasonic echo signals. The receiving circuit 30 may include one or more amplifiers, analog-to-digital converters (ADC), etc. The amplifier may be configured to amplify the received echo signals after appropriate gain compensation. The ADC may be configured to sample analog echo signals at a predetermined time interval to convert them into a digitized signal which still remains amplitude information, frequency information and phase information. The data output by the receiving circuit 30 may be output to the beam former 40 for processing or to the memory 60 for storage.

Figure 2:
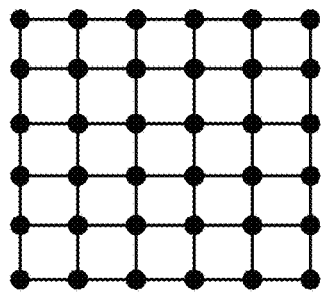
FIG. 2 is a schematic diagram of beam forming points of a linear array probe according to an embodiment.
Figure 3:
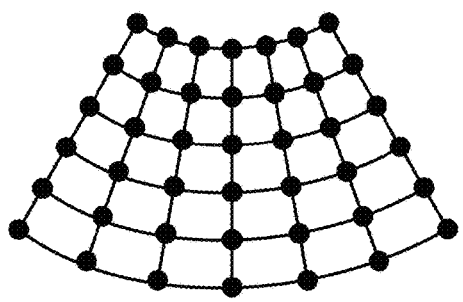
FIG. 3 is a schematic diagram of beam forming points of a convex array probe according to an embodiment.

The beam former 40 in signal communication with the receiving circuit 30 may be configured to perform beam forming on the echo signals. Beam forming is to reconstruct the channel data from a channel domain (for example, the data dimension thereof is: time direction*the number of channels*the number of transmissions) into beam domain data (for example, the data dimension thereof is: the number of points in the longitudinal direction*the number of points in the transverse line, which is a point in actual physical space). A beam forming point may refer to each output point in the beam domain, for example, FIG. 2 schematically shows the beam forming point of the linear array probe, and FIG. 3 schematically shows the beam forming point of the convex array probe. In ultrasonic imaging, a frame of two-dimensional image is obtained by sequentially arranging several beam forming points in a two-dimensional plane according to a spatial position relationship, and then performing such operations as envelope detection, dynamic range compression and digital scan conversion (DSC). The beam forming points herein correspond to the above-mentioned location points (for example, in a one-to-one correspondence or in other manners). A variety of beam forming procedures may be pre-stored in the memory 60, including but not be limited to, a delayed and apodized summation (DAS) procedure, a minimum variance (MV) beam forming procedure, a coherent factor beam forming procedure, an incoherent beam forming procedure, or a frequency domain beam forming procedure, etc. In this embodiment, at least two of the above-mentioned beam forming procedures may be pre-stored in the memory 60. The aforesaid beam forming procedures have respective applicability and respective advantages and disadvantages.

As used herein, "different beam forming procedures" or "a plurality of beam forming procedures" may refer to the fact that the beam forming procedures differ in at least one of the principles, steps and parameters, including different beam forming procedures (principles), or the same procedures (principles) with different steps therein (for example, increasing or decreasing steps or changing the sequence of steps, etc.), or different parameters used therein. The beam forming procedures under such cases are considered to be "different" or "various" of beam forming procedures.

The human-computer interaction device 70 may be configured to receive an instruction input by a user and give corresponding information back to users. The human-computer interaction device 70 may include but not be limited to devices such as a display, a keyboard, a mouse and a trackball. The display may be a touch control screen or a non-touch control screen; and when the display is a touch control screen, the instruction may be directly input by the user by clicking on the screen. Typically, prior to performing ultrasound imaging, imaging setting(s), which may include but not be limited to the probe type of the ultrasonic probe 10, the scan mode of the ultrasonic probe 10, the type of biological tissue under examination and the imaging parameter(s) for ultrasonic imaging, may be performed by the user via the human-computer interaction device 70. The probe type may include but not be limited to high-frequency probe, low-frequency probe, phased array probe, volume probe, two-dimensional matrix probe, conventional linear array probe, conventional convex array probe, etc. The probe scan mode may include but not be limited to a linear scan mode, a sector scan mode, an extended scan mode, a volume scan mode (three-dimensional scanning), etc. The type of biological tissue under examination may refer to the type of an object expected to be scanned by an ultrasonic examination, such as a small organ, a thin tissue, a well-defined boundary organ, a relatively uniform organ tissue, a complex structure tissue, a relatively fast moving tissues, and so on; specifically, such as thyroid, mammary gland, nerve, abdomen, heart, liver, kidney, muscle bone, etc. Imaging parameters refer to any parameters currently used in ultrasonic imaging, including but not be limited to frequency (i.e. where the ultrasonic waves are transmitted during imaging), aperture, focus, imaging depth, gain, settings of transmission line and receiving line, number of transmissions, etc. If the aforesaid imaging settings do not be carried out by the user, it is also feasible to enter a default imaging setting.

The processor 50 may be configured as a central controller circuit (CPU), one or more microprocessors, graphics controller circuits (GPUs), or any other electronic component capable of processing input data in accordance with specific logic instructions. It may perform control of peripheral electronic components based on the input instructions or predetermined instructions, or perform data reading and/or storage from the memory 60, or perform processing of input data by executing programs in the memory 60. The processor 50 may control the operations of the transmitting circuit 20 and the receiving circuit 30, for example, controlling the transmitting circuits 20 and receiving circuits 30 work alternately or simultaneously. The processor 50 may also determine an appropriate operating mode according to a user's selection or a program setting to generate a transmission sequence corresponding to the current operating mode, and transmit the transmission sequence to the transmitting circuit 20, so that the transmitting circuit 20 adopts the appropriate transmission sequence to control the ultrasonic probe 10 to transmit the ultrasonic waves.

The processor 50 may also be configured to be in signal communication with the beam former 40 to generate a corresponding ultrasonic image based on the signals or data output from the beam former 40. The processor 50 may determine a beam forming procedure corresponding to the imaging setting from the plurality of predetermined beam forming procedures based on the obtained imaging settings mentioned above; that is, the appropriate beam forming procedure may be automatically matched based on the imaging settings. For example, after setting a scene mode, when the selected scene mode includes the small organ and/or the thin tissue (e.g., nerves), a higher image spatial resolution is required, and the beam forming procedure may be the minimum variance (MV) beam forming procedure; when the selected scene mode includes the well-defined boundary organ (such as the heart, muscle and bone and other human tissues), better boundary enhancement is required for display ability, and the beam forming procedure may be the coherent factor beam forming procedure. The beam forming procedure may be specifically selected mainly according to one aspect of the above-mentioned imaging settings, or according to the results of comprehensive evaluation of various settings. That is to say, there may be a predetermined matching rule between the imaging settings and beam forming, and the user performing the imaging settings is also equivalent to inputting a condition for selecting the beam forming procedure, thereby automatically selecting the beam forming procedure.

For example, in an embodiment, the imaging settings may include the type of biological tissue under examination. As such, the beam forming procedure corresponding to the imaging setting may be determined from the plurality of predetermined beam forming procedures based on the type of biological tissue under examination. For example, when the type of the biological tissue under examination to be tested is small organ or thin tissue, the beam forming procedure corresponding to the imaging setting may be determined as the minimum variance (MV) beam forming procedure; or when the type of biological tissue under examination is well-defined boundary organ, the beam forming procedure corresponding to the imaging setting may be determined as the coherent factor beam forming procedure; or when the type of biological tissue under examination is uniform organ tissue, the beam forming procedure corresponding to the imaging setting may be determined as the beam forming procedure using coherence using incoherence; or when the type of biological tissue under examination may be complex structure tissue, the beam forming procedure corresponding to the imaging setting may be determined as the delay and sum (DAS) beam forming procedure; or when the type of biological tissue under examination is fast moving tissue, the beam forming procedure corresponding to the imaging setting may be determined as the frequency domain beam forming procedure; and the like.

For example, in an embodiment, the imaging setting may include the type of ultrasonic probe. As such, the beam forming procedure corresponding to the imaging setting may be determined from the plurality of predetermined beam forming procedures based on the ultrasonic probe type. For example, when the ultrasonic probe type is high-frequency probe, the beam forming procedure corresponding to the imaging setting may be determined as the minimum variance (MV) beam forming procedure; or when the ultrasonic probe type is phased array probe, volume probe or two-dimensional matrix probe, the beam forming procedure corresponding to the imaging setting may be determined as the frequency domain beam forming procedure; or when the ultrasonic probe type is conventional linear array probe or conventional convex array probe, the beam forming procedure corresponding to the imaging setting may be determined as the coherent factor beam forming procedure, or the incoherent beam forming procedure, or the delay and sum (DAS) beam forming procedure; and the like.

For example, in an embodiment, the imaging setting may include a probe scan mode. As such, the beam forming procedure corresponding to the imaging setting may be determined from the plurality of predetermined beam forming procedures based on the probe scan mode. For example, when the probe scan mode is linear scan mode, the beam forming procedure corresponding to the imaging setting may be determined as the minimum variance (MV) beam forming procedure; or when the probe scan mode is sector scan mode, the beam forming procedure corresponding to the imaging setting may be determined as the coherent factor beam forming procedure or the incoherent beam forming procedure; or when the probe scan mode is the extended scan mode, the beam forming procedure corresponding to the imaging setting may be determined as the delay and sum (DAS) beam forming procedure; or when the probe scan mode is the volume scan mode, the beam forming procedure corresponding to the imaging setting may be determined as the frequency domain beam forming procedure; and the like.

In an embodiment, the imaging setting may include imaging parameters for ultrasonic imaging. As such, the beam forming procedure corresponding to the imaging setting may be determined from the plurality of predetermined beam forming procedures based on the imaging setting. For example, when the imaging parameter is small imaging depth or high ultrasonic frequency (the frequency of the transmitted ultrasonic waves during imaging), the beam forming procedure corresponding to the imaging setting may be determined as the minimum variance (MV) beam forming procedure; or when the imaging parameter is high gain or low ultrasonic frequency, the beam forming procedure corresponding to the imaging setting may be determined as the coherent factor beam forming procedure; or when the imaging parameter is high line density or high number of transmissions, the beam forming procedure corresponding to the imaging setting may be determined as the incoherent beam forming procedure; or when the imaging parameter is middle ultrasonic frequency, the beam forming procedure corresponding to the imaging setting may be determined as the delay and sum (DAS) beam forming procedure; or when the imaging parameter is large imaging depth or high frame rate, the beam forming procedure corresponding to the imaging setting may be determined as the frequency domain beam forming procedure; and the like.

It should be noted that the above listed is only some examples of determining a corresponding beam forming procedure according to the imaging setting, but the present disclosure is not limited to this. Any other suitable correspondence of the imaging setting to the beam forming procedure may be used.

Figure 4:
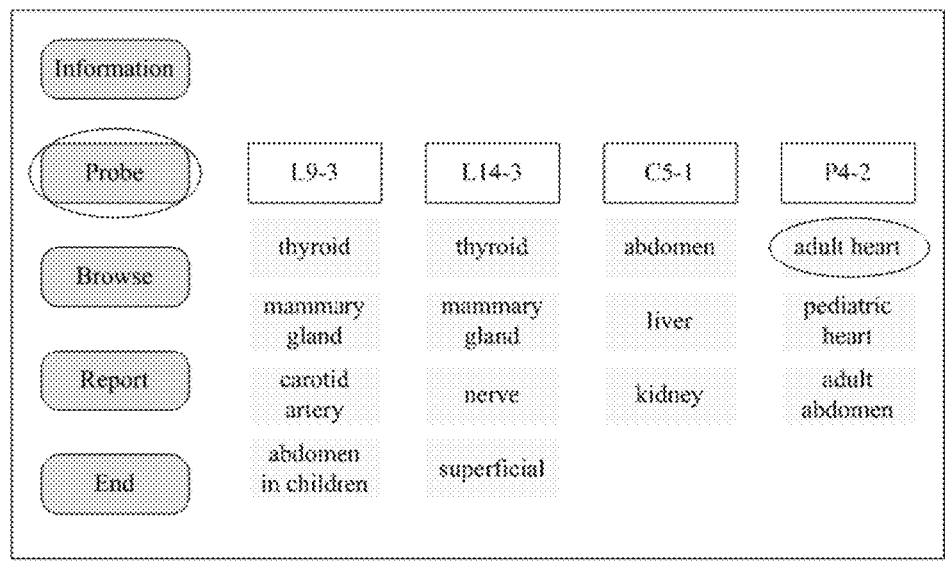
FIG. 4 is a schematic diagram of a display interface for imaging setting according to an embodiment.
Figure 5:
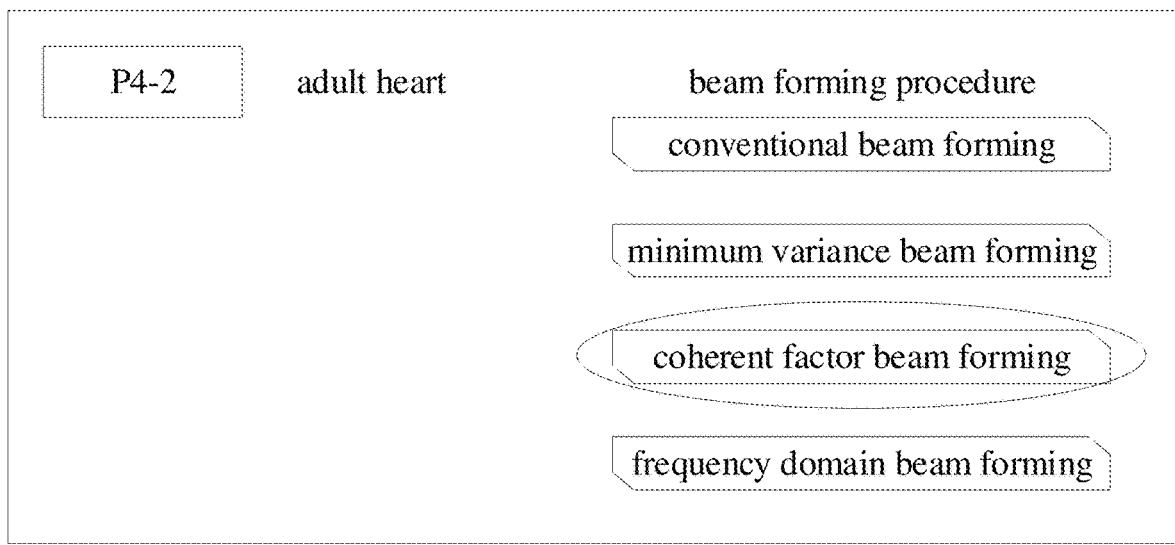
FIG. 5 is a schematic diagram of an interface for selecting a beam forming procedure based on the imaging setting according to an embodiment.

In some embodiments it is also possible to select which beam forming procedure to use in conjunction with the user's actions. The processor 50 may display at least one beam forming selection item after detecting that the imaging setting for the ultrasonic imaging is completed, wherein each beam forming selection item is associated with a beam forming procedure. When the user selects an option, a selection instruction may be generated, thereby invoking a corresponding beam forming procedure. For example, referring to FIG. 4 and FIG. 5, the selected probe type and scene mode may need to be selected by the user first. When the user clicks "Probe" button, optional probe type and scene mode may be displayed on the right side, from which expected probe type and scene mode may be selected by the user, such as selecting "adult heart", and then ultrasonic imaging may be started. As such, a beam forming procedure recommended based on the currently selected probe type and scene mode may be popped up on a display interface. Since there needs to enhance the contrast display between the myocardium and the heart cavity during the examination of a heart, the beam forming selection item of "beam forming using coherence" may be chosen. The user may also change the beam forming procedure through the display interface during diagnosis of the patient.

In some embodiments, the processor 50 may include an procedure selection sub-processor 51 and an image generation sub-processor 52. The procedure selection sub-processor 51 may be provided with predetermined relationships between different imaging settings and corresponding beam forming procedures. For example, the procedure selection sub-processor 51 may automatically select a corresponding beam forming procedure according to an input conditions (imaging setting); for another example, after a corresponding beam forming selection item is selected by the user, the procedure selection sub-processor 51 may automatically select a corresponding according to an instruction input by the user. After determining the beam forming procedure, the beam former 40 may generate the beam-formed data based on the selected beam forming procedure; and then the image generation sub-processor 52 may generate an ultrasonic image according to the beam-formed data.

In some embodiments, after generating the ultrasonic image, the processor 50 may also re-determine a more appropriate beam forming procedure based on the information contained in the ultrasonic image itself. The processor 50 may obtain tissue information contained in the generated ultrasonic image, and re-determine the beam forming procedure from a plurality of beam forming procedures based on the tissue information. The tissue information may include at least one of the size, type and structure of the tissue in the ultrasonic image.

In some embodiments, it may be determined mainly from the tissue information whether large structure information and/or the tissue boundary dominates or small structure information dominates; when the large structure information and/or the tissue boundary dominates, the beam forming procedure using coherence may be selected to highlight information about structure boundary; when the small structure information dominates, the beam forming procedure using adaptation may be selected to improve detail resolution; and when neither is dominant, conventional beam forming procedure may be selected with the advantage of strong robustness. One way to determine which structure dominates may be: making statistics on a first proportion of the large structure information and tissue boundary of the ultrasonic image in the overall image and that on a second proportion of the small structure information of the ultrasonic image in the overall image, determining that the large structure information and/or tissue boundary dominates when the first proportion is greater than the second proportion and a predetermined proportion threshold, and determining that the small structure information dominates when the first proportion is smaller than the second proportion and greater than the proportion threshold.

After re-determining the beam forming procedure, the processor 50 may control the beam former 40 to perform beam forming on all echo signals or the echo signals of a region of interest at least including tissue with the re-determined beam forming procedure when the ultrasonic probe 10 continues to transmit ultrasonic waves and receive echo signals. Generally speaking, the user may also pay special attention to the region of interest in which the tissue information is more critical, so that a new beam forming procedure may be used only for the echo signals of the region of interest, and of course a newly determined beam forming procedure may also be used for all echo signals.

The shape of the region of interest may be regular or irregular, and the way in which the region of interest is determined may be automatic or non-automatic. The automatic way may include but not be limited to: the processor 50 determining the region of interest in the ultrasonic image by image recognition and other techniques; for example, performing feature extraction on the ultrasonic image to obtain features of the entire image, and then performing matching detection on the features of the image to obtain one or more matched region as the region(s) of interest. The non-automatic way may include but not be limited to: selecting the region of interest on the ultrasonic image by a manual operation by the user; for example, selecting one or more regions of interest by means of gestures, peripherals, voice controls, or the like from the ultrasonic image which has been outputted on the display by the processor 50.

In some embodiments, instead of selecting a corresponding beam forming procedure based on the imaging setting, a subsequent beam forming procedure may be determined directly based on the tissue information in the ultrasonic image(s) after generating one or several frames of ultrasonic images. That is, for the user, it may mean that several ultrasonic images may be obtained firstly for determining what beam forming procedure is to be used for "formal" ultrasonic imaging, and the first one or several frames of ultrasonic images may be generated after obtaining beam-formed data using a default beam forming procedure.

In addition, during the continuous process of ultrasonic imaging, the processor 50 may also detect the imaging setting of the current ultrasonic imaging in real time, and when it is detected that the imaging setting is adjusted, the beam forming procedure corresponding to the adjusted imaging setting may be determined from the plurality of predetermined beam forming procedures based on the change of the imaging setting, thereby generating a new ultrasonic image.

That is, after selecting the beam forming procedure, if the user adjusts the imaging setting during ultrasonic imaging, the beam forming procedure may be automatically changed according to the adjusted imaging setting, and a new beam-formed data may be continuously generated according to the new beam forming procedure.

For example, in one embodiment, the adjusted imaging setting of the current ultrasonic imaging may be obtained, and the beam forming procedure corresponding to the imaging setting may be determined from the plurality of predetermined beam forming procedures according to the adjusted imaging setting. The ultrasonic probe may be controlled to transmit ultrasonic waves to the biological tissue under examination according to the adjusted imaging setting, and obtain echo signals returned by the biological tissue under examination. The echo signals may be beam synthesized with the determined beam forming procedure corresponding to the adjusted imaging setting to generate the beam-formed data. The ultrasonic image of the biological tissue under examination based on the beam-formed data.

In some embodiments, not all adjustments to the imaging settings may re-determine the beam forming procedure. For example, the adjusted imaging setting of the current ultrasonic imaging may be obtained, and whether the adjusted imaging setting meets the first predetermined condition may be determined, and when the adjusted imaging setting meets the first predetermined condition, the currently used beam forming procedure may be switched to the corresponding beam forming procedure corresponding to the adjusted imaging setting. Here, the first predetermined condition may be any suitable condition. For example, it may be that the adjusted imaging setting changes relative to the pre-adjusted imaging setting greater than the predetermined threshold, and so on.

Alternatively, in some embodiments, it is possible to obtain the adjusted imaging setting of the current ultrasonic imaging and determine whether the adjusted imaging setting meets the second predetermined condition, and when the adjusted imaging setting meets the second predetermined condition, the current beam forming procedure may remain unchanged. Here, the second predetermined condition may be that the adjusted imaging setting is a predetermined type of the imaging setting, or the like.

For example, after the image setting is adjusted, it is first determined whether the type of parameter being adjusted in the imaging setting is relevant to the beam forming procedure. For example, when the type of parameter being adjusted in the imaging setting is a signal gain and/or a TGC curve, it is judged that the type of parameter being adjusted is independent of the beam forming procedure; and when the type of parameter to be adjusted in the imaging setting is the depth of focus and/or the transmission frequency, it is judged that the type of parameter being adjusted is related to the beam forming procedure. If the judgment result is irrelevant, the current beam forming procedure may be maintained. If the judgment result is relevant, the change value of the parameter may be used to determine how to select the beam forming procedure; for example, it may be judged whether the change value of the parameter being adjusted in the imaging setting is greater than the predetermined threshold, when the change value is greater than the predetermined threshold, the currently used beam forming procedure may be replaced with a beam forming procedure corresponding to the parameter type; otherwise, the currently used beam forming procedure may be kept unchanged. For example, when the depth (an imaging parameter) is changed from deeper to shallower, or when the frequency (an imaging parameter) is changed from low frequency to high frequency, it may be judged that the user wants to see the tissue more clearly, and a better spatial resolution should be presented. At this time, the corresponding beam forming procedure needs to be adjusted, for example, adjusting to the beam forming procedure using adaptation, to improve spatial resolution and match the image effect desired by the user.

It is easy to understand that when the image setting is adjusted, it is also possible to re-pop corresponding beam forming selection items on the display interface for the user to re-select without automatically changing the beam forming procedure.

Figure 6:
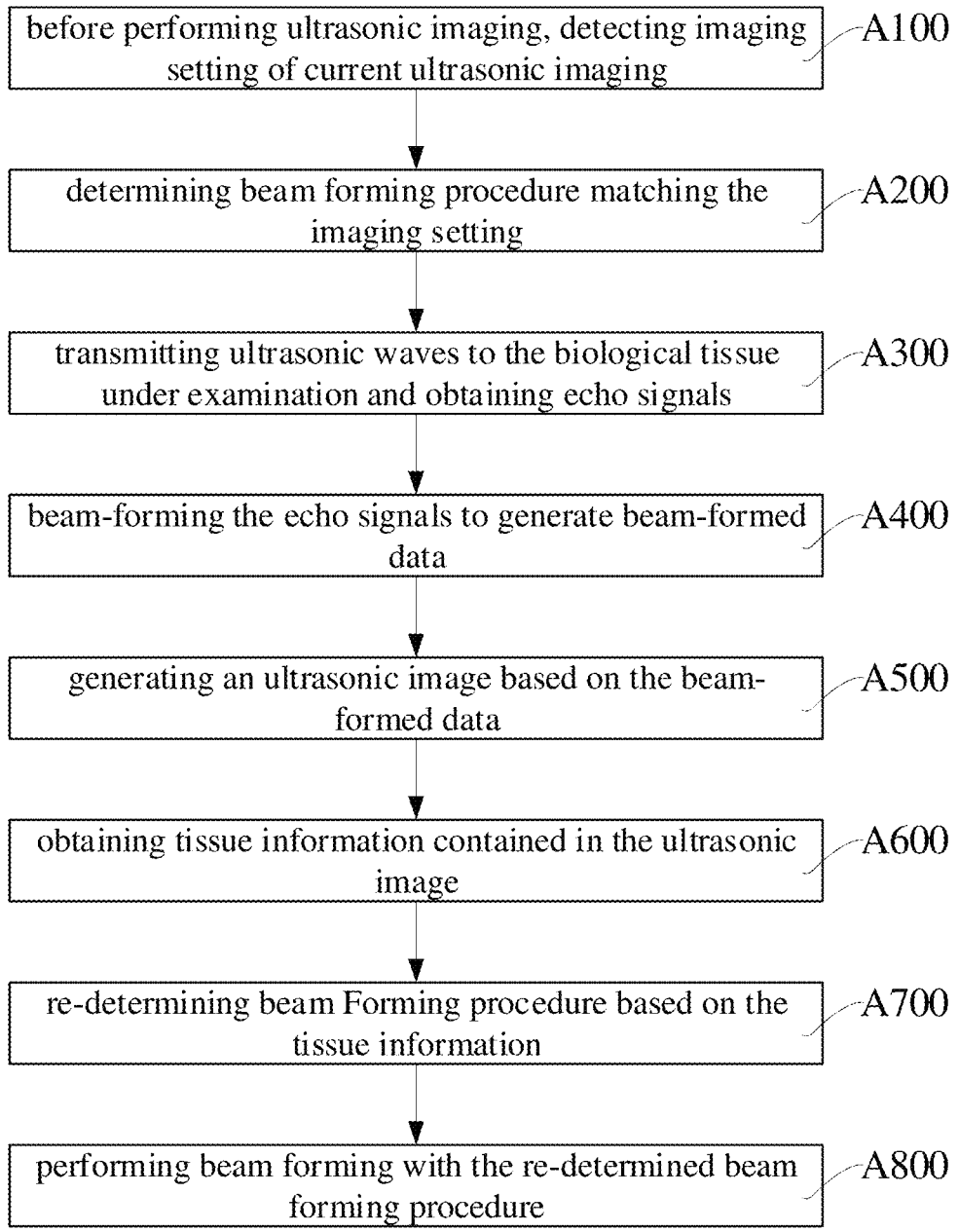
FIG. 6 is a flowchart of an ultrasonic imaging method according to an embodiment.

Referring to FIG. 6, there is provided an ultrasonic imaging method according to an embodiment comprising the steps of:

Step A100: detecting the imaging setting for current ultrasonic imaging before ultrasonic imaging.

The imaging setting may include but not be limited to the probe type of the ultrasonic probe 10, the scan imaging mode of the ultrasonic probe 10, the type of biological tissue under examination and the imaging parameter(s).

The probe type may include but not be limited to high-frequency probe, low-frequency probe, phased array probe, volume probe, two-dimensional matrix probe, conventional linear array probe, conventional convex array probe, etc. The probe scan mode may include but not be limited to a linear scan mode, a sector scan mode, an extended scan mode, a volume scan mode (three-dimensional scanning), etc. The type of biological tissue under examination may refer to the type of an object expected to be scanned by an ultrasonic examination, such as a small organ, a thin tissue, a well-defined boundary organ, a relatively uniform organ tissue, a complex structure tissue, a relatively fast moving tissues, and so on; specifically, such as thyroid, mammary gland, nerve, abdomen, heart, liver, kidney, muscle bone, etc. Imaging parameters refer to any parameters currently used in ultrasonic imaging, including but not be limited to frequency (i.e. where the ultrasonic waves are transmitted during imaging), aperture, focus, imaging depth, gain, settings of transmission line and receiving line, number of transmissions, etc.

Generally, the imaging setting may be completed by the user before ultrasonic imaging, and if the user does not make the above imaging setting, the default imaging setting may be accessed.

Step A200: determining the beam forming procedure corresponding to the imaging setting from the plurality of predetermined beam forming procedures.

Figure 7:
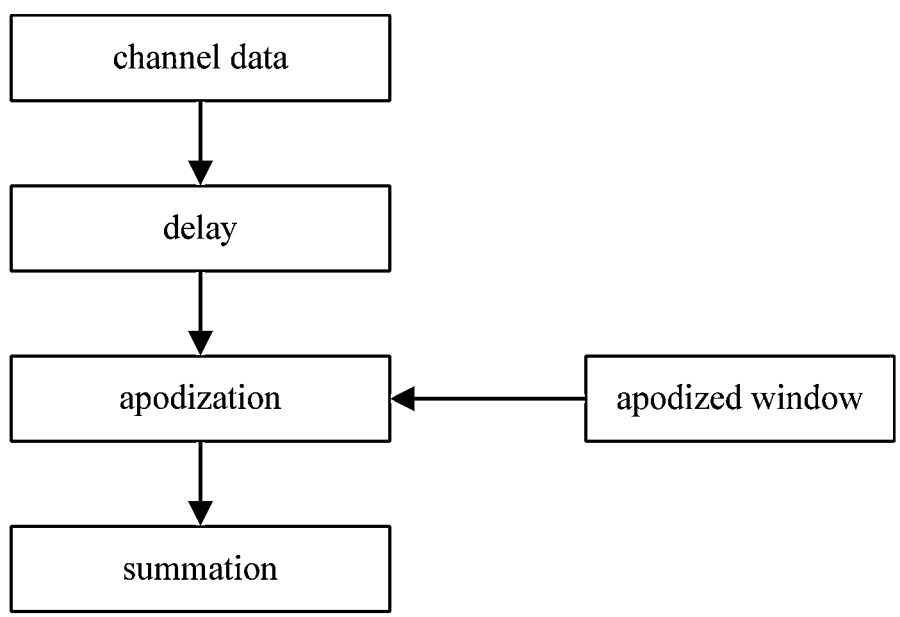
FIG. 7 is a schematic diagram of a synthesis process of a delayed and apodized summation (DAS) procedure according to an embodiment.

The predetermined beam forming procedure may include but not be limited to the DAS procedure, the minimum variance (MV) beam forming procedure, the coherent factor beam forming procedure, a filter-delay-multiplication-summation procedure, etc. The aforesaid beam forming procedures have respective applicability and respective advantages and disadvantages. Specifically:

As shown in FIG. 7, the delayed and apodized summation (DAS) procedure, the most commonly used beam forming procedure, is to align each channel data according to a corresponding delay time, and then perform apodization weighted summation on the aligned channel data, wherein the apodization coefficient is a set of predetermined window functions, such as a rectangular window, a Hanning window and a Gaussian window, etc. Since this method is simple in principle and easy to implement, it is widely used in ultrasonic imaging systems; however, because the apodization weight is a set of predetermined coefficients, it cannot be adapted to transform according to the characteristics of the received echo data, and the image obtained by the DAS procedure cannot achieve the optimal image effect in all clinical application scenarios.

Figure 8:
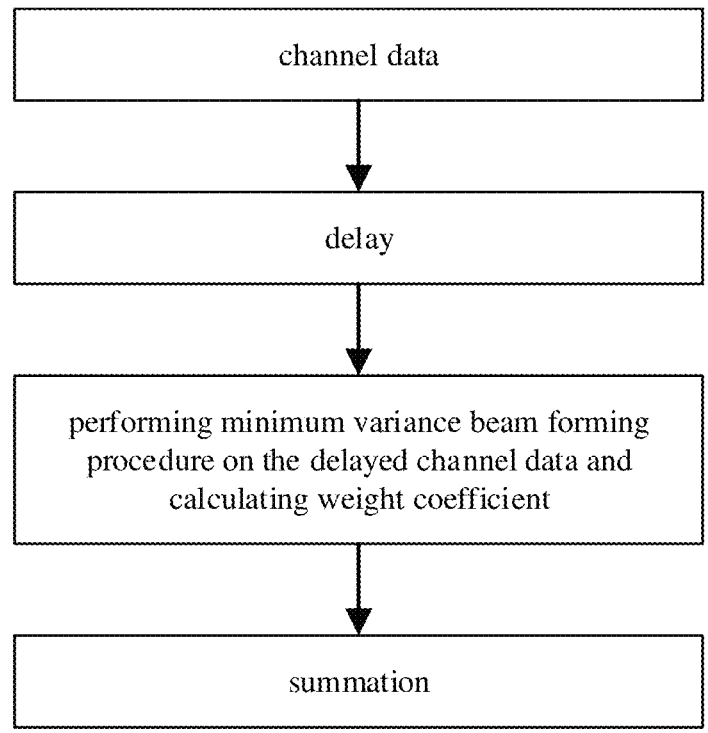
FIG. 8 is a schematic diagram of a synthesis process of the minimum variance (MV) beam forming procedure according to an embodiment.

FIG. 8 shows the synthesis process of the minimum variance (MV) beam forming procedure. In such synthesis procedure, the current weight coefficient is calculated according to the least variance procedure after the channel data is delayed, and then accumulation and summation is carried out. This method can adaptively calculate the weight according to the received channel data, the weight coefficient between each frame, the weight coefficient of each section, and the weight coefficient under each condition are different, which is closely related to the received channel data and adaptively calculated, so that the width of main lobe can be narrowed and the level of side lobe can be reduced, the spatial resolution and contrast resolution of the image can be improved, and the effect is obvious when small lesions need to be displayed. However, this method will lead to a larger background variance of the image. For the tissue with relatively high moving speed, the increase of background variance will seriously affect the identification and judgment of the tissue structure.

Figure 9:
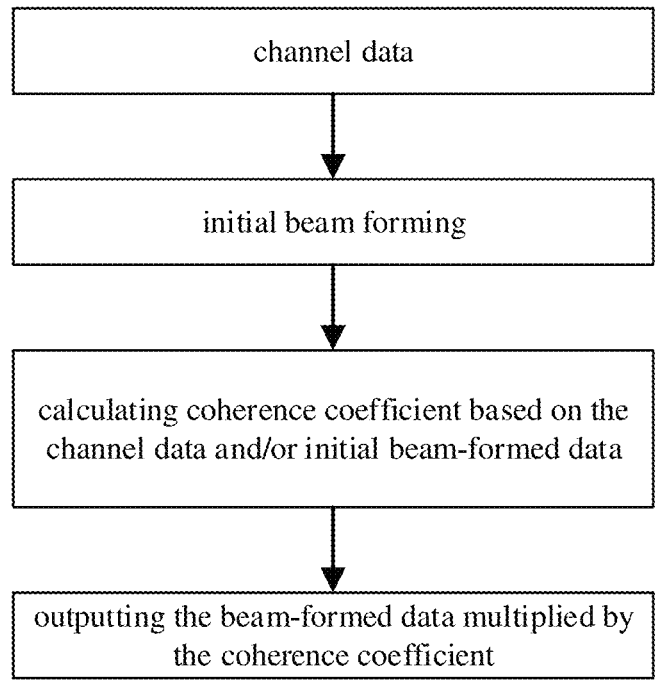
FIG. 9 is a schematic diagram of a synthesis process of the coherent factor beam forming procedure according to an embodiment.
Figure 10:
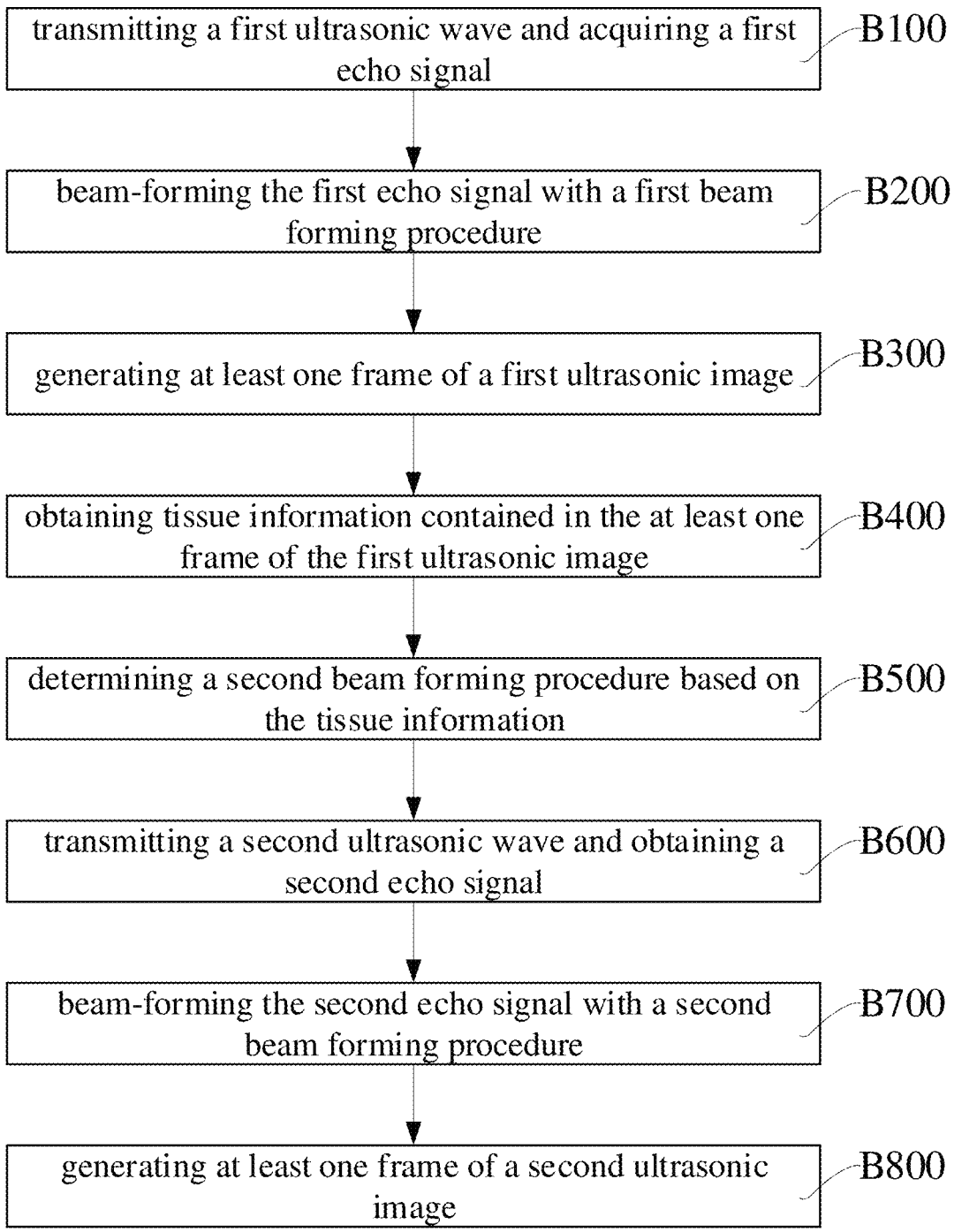
FIG. 10 is a flowchart of an ultrasonic imaging method according to another embodiment.

FIG. 9 shows the synthesis process of the coherent factor beam forming procedure. The coherent factor beam forming procedure is to calculate the coherence of channel echo data or initial beam-formed data to obtain a coherence coefficient which then multiplies the initial beam-formed data to output as a final beam forming output. The principle thereof is that the coherence between the received echo signals is strong, while there is no coherence between noises, and the signals are further improved and the noises are suppressed through the calculation of the coherence coefficient. This method has a very good effect on strong reflection signals, such as the tissue boundary of strong echoes, which will further improve the image contrast, but the contrast weak signal, such as the lesion of weak echo, will have inhibitory effect, which is easy to cause misdiagnosis.

In some embodiments, the beam forming procedure corresponding to the imaging setting is automatically determined, that is, an appropriate beam forming procedure is automatically matched according to the imaging setting. For example, after setting a scene mode, when the selected scene mode includes the small organ and/or the thin tissue (e.g., nerves), a higher image spatial resolution is required, and the beam forming procedure may be the minimum variance (MV) beam forming procedure; when the selected scene mode includes the well-defined boundary organ (such as the heart, muscle and bone and other human tissues), better boundary enhancement is required for display ability, and the beam forming procedure may be the coherent factor beam forming procedure. The beam forming procedure may be specifically selected mainly according to one aspect of the above-mentioned imaging settings, or according to the results of comprehensive evaluation of various settings. That is to say, there may be a predetermined matching rule between the imaging settings and beam forming, and the user performing the imaging settings is also equivalent to inputting a condition for selecting the beam forming procedure, thereby automatically selecting the beam forming procedure.

In this embodiment, the example of determining the corresponding beam forming procedure according to the imaging setting may be the same or similar to the example in the embodiments described above and will not be repeated here.

In some other embodiments it is also possible to select which beam forming procedure to use in conjunction with the user's actions. For example, at least one beam forming selection item may be displayed after detecting that the imaging setting for the ultrasonic imaging is completed, wherein each beam forming selection item is associated with a beam forming procedure. When the user selects an option, a selection instruction may be generated, thereby invoking a corresponding beam forming procedure. For example, referring to FIG. 4 and FIG. 5, the selected probe type and scene mode may need to be selected by the user first. When the user clicks "Probe" button, optional probe type and scene mode may be displayed on the right side, from which expected probe type and scene mode may be selected by the user, such as selecting "adult heart", and then ultrasonic imaging may be started. As such, a beam forming procedure recommended based on the currently selected probe type and scene mode may be popped up on a display interface. Since there needs to enhance the contrast display between the myocardium and the heart cavity during the examination of a heart, the beam forming selection item of "beam forming using coherence" may be chosen. The user may also change the beam forming procedure through the display interface during diagnosis of the patient.

Step A300: controlling the ultrasonic probe 10 to the biological tissue under examination 200 according to the imaging setting and obtain echo signals from the biological tissue under examination 200.

Step A400: beam-forming the echo signals by using the determined beam forming procedure to generate beam-formed data.

Step A500: generating an ultrasonic image of the biological tissue under examination 200 based on the beam-formed data.

In some embodiments, after generating the ultrasonic image, a more appropriate beam forming procedure may also be re-determined based on the information contained in the ultrasonic image itself, which may include the steps of:

Step A600: obtaining tissue information contained in the ultrasonic image. The tissue information may include, among other things, at least one of the size, type and structure of the tissue in the ultrasonic image.

Step A700: re-determining a beam forming procedure from the plurality of beam forming procedures based on the tissue information.

In some embodiments, it may be determined mainly from the tissue information whether large structure information and/or the tissue boundary dominates or small structure information dominates; when the large structure information and/or the tissue boundary dominates, the beam forming procedure using coherence may be selected to highlight information about structure boundary; when the small structure information dominates, the beam forming procedure using adaptation may be selected to improve detail resolution; and when neither is dominant, conventional beam forming procedure may be selected with the advantage of strong robustness. One way to determine which structure dominates may be: making statistics on a first proportion of the large structure information and tissue boundary of the ultrasonic image in the overall image and that on a second proportion of the small structure information of the ultrasonic image in the overall image, determining that the large structure information and/or tissue boundary dominates when the first proportion is greater than the second proportion and a predetermined proportion threshold, and determining that the small structure information dominates when the first proportion is smaller than the second proportion and greater than the proportion threshold.

Step A800: beam-forming all echo signals or echo signals of a region of interest at least containing tissue information by using the re-determined beam forming procedure.

Generally speaking, the user may also pay special attention to the region of interest in which the tissue information is more critical, so that a new beam forming procedure may be used only for the echo signals of the region of interest, and of course a newly determined beam forming procedure may also be used for all echo signals. The shape of the region of interest may be regular or irregular, and the way in which the region of interest is determined may be automatic or non-automatic. The automatic way may include but not be limited to: the processor 50 determining the region of interest in the ultrasonic image by image recognition and other techniques; for example, performing feature extraction on the ultrasonic image to obtain features of the entire image, and then performing matching detection on the features of the image to obtain one or more matched region as the region(s) of interest. The non-automatic way may include but not be limited to: selecting the region of interest on the ultrasonic image by a manual operation by the user; for example, selecting one or more regions of interest by means of gestures, peripherals, voice controls, or the like from the ultrasonic image which has been outputted on the display by the processor 50.

In some embodiments, instead of selecting a corresponding beam forming procedure based on the imaging setting, a subsequent beam forming procedure may be determined directly based on the tissue information in the ultrasonic image(s) after generating one or several frames of ultrasonic images. That is, for the user, it may mean that several ultrasonic images may be obtained firstly for determining what beam forming procedure is to be used for "formal" ultrasonic imaging, and the first one or several frames of ultrasonic images may be generated after obtaining beam-formed data using a default beam forming procedure.

Step B100: according to the imaging setting of the current ultrasonic imaging, controlling the ultrasonic probe to transmit a first ultrasonic wave to the biological tissue under examination and obtain first echo signals from the biological tissue under examination.

The imaging setting in this step has the same meaning as that in the previous steps and will not be repeated here.

Step B200: beam-forming the first echo signals with a first beam forming procedure.

Step B300: generating at least one frame of a first ultrasonic image of the biological tissue under examination based on the beam-formed data obtained by the first beam forming procedure.

Step B400: obtaining the tissue information contained in at least one frame of the first ultrasonic image.

The meaning of the tissue information in this step is the same as that in the preceding steps; accordingly, it is unnecessary to repeat here.

Step B500: determining a second beam forming procedure from the plurality of predetermined beam forming procedures based on the tissue information.

The way in which the second beam forming procedure is determined from the tissue information may be similar to the way in which the beam forming procedure is redetermined in step A700.

Step B600: controlling the ultrasonic probe to transmit a second ultrasonic wave to the biological tissue under examination and obtain second echo signals from the biological tissue under examination.

Step B700: beam-forming the second echo signals with the second beam forming procedure.

Step B800: generating at least one frame of a second ultrasound image of the biological tissue under examination based on the beam-formed data obtained by the second beam forming procedure.

In some embodiments, after the selection of the beam forming procedure, steps may also be included:

Step C300: detecting the imaging setting of the current ultrasonic imaging in real time.

Step C400: when it is detected that the imaging setting is adjusted, a beam forming procedure corresponding to the adjusted imaging setting from the plurality of beam forming procedures based on the change of the imaging setting. The beam forming procedure corresponding to the adjusted imaging setting may be used to generate a new ultrasonic image of the biological tissue under examination 200.

That is, after selecting the beam forming procedure, if the user adjusts the imaging setting during ultrasonic imaging, the beam forming procedure may be automatically changed according to the adjusted imaging setting, and a new beam-formed data may be continuously generated according to the new beam forming procedure.

In some embodiments, not all adjustments to the imaging settings may re-determine the beam forming procedure. After the image setting is adjusted, it is first determined whether the type of parameter being adjusted in the imaging setting is relevant to the beam forming procedure. For example, when the type of parameter being adjusted in the imaging setting is a signal gain and/or a TGC curve, it is judged that the type of parameter being adjusted is independent of the beam forming procedure; and when the type of parameter to be adjusted in the imaging setting is the depth of focus and/or the transmission frequency, it is judged that the type of parameter being adjusted is related to the beam forming procedure. If the judgment result is irrelevant, the current beam forming procedure may be maintained. If the judgment result is relevant, the change value of the parameter may be used to determine how to select the beam forming procedure; for example, it may be judged whether the change value of the parameter being adjusted in the imaging setting is greater than the predetermined threshold, when the change value is greater than the predetermined threshold, the currently used beam forming procedure may be replaced with a beam forming procedure corresponding to the parameter type; otherwise, the currently used beam forming procedure may be kept unchanged. For example, when the depth (an imaging parameter) is changed from deeper to shallower, or when the frequency (an imaging parameter) is changed from low frequency to high frequency, it may be judged that the user wants to see the tissue more clearly, and a better spatial resolution should be presented. At this time, the corresponding beam forming procedure needs to be adjusted, for example, adjusting to the beam forming procedure using adaptation, to improve spatial resolution and match the image effect desired by the user.

It is easy to understand that when the image setting is adjusted, it is also possible to re-pop corresponding beam forming selection items on the display interface for the user to re-select without automatically changing the beam forming procedure.

The above-described embodiments can determine the most appropriate beam forming procedure according to the conditions of different scene modes, probe types, imaging parameters, etc. so as to obtain the best ultrasonic imaging effect.

The present disclosure is illustrated with reference to various exemplary embodiments. However, those skilled in the art may recognize that the exemplary embodiments can be changed and modified without departing from the scope of the present disclosure. For example, various operation steps and components used to execute the operation steps may be implemented in different ways (for example, one or more steps may be deleted, modified, or combined into other steps) according to specific application(s) or any number of cost functions associated with the operation of the system.

In addition, as understood by those skilled in the art, the principles herein may be reflected in a computer program product on a computer-readable storage medium that is preloaded with computer-readable program code. Any tangible, non-temporary computer-readable storage medium can be used, including magnetic storage devices (hard disks, floppy disks, etc.), optical storage devices (CD-ROMs, DVDs, Blu Ray disks, etc.), flash memory and/or the like. The computer program instructions may be loaded onto a general purpose computer, a special purpose computer, or other programmable data processing device to form a machine, so that these instructions executed on a computer or other programmable data processing device can form a device that realizes a specified function. These computer program instructions may also be stored in a computer-readable memory that can instruct a computer or other programmable data processing device to run in a specific way, so that the instructions stored in the computer-readable memory can form a manufacturing product, including a realization device to achieve a specified function. The computer program instructions may also be loaded onto a computer or other programmable data processing device to execute a series of operating steps on the computer or other programmable device to produce a computer-implemented process, so that instructions executed on the computer or other programmable device can provide steps for implementing a specified function.

Although the principles herein have been shown in various embodiments, many modifications to structures, arrangements, proportions, elements, materials, and components that are specifically adapted to specific environmental and operational requirements may be used without deviating from the principles and scope of the present disclosure. These and other modifications and amendments will be included in the scope of the present disclosure.

The foregoing specific description has been illustrated with reference to various embodiments. However, those skilled in the art will recognize that various modifications and changes can be made without departing from the scope of the present disclosure. Accordingly, the present disclosure is illustrative rather than restrictive, and all such modifications will be included in its scope. Similarly, there are solutions to these and other advantages and problems of the various embodiments as described above. However, the benefits, the advantages, solutions to problems, and any elements that can produce them or make them more explicit should not be interpreted as critical, required, or necessary one. The term "comprise" and any other variations thereof used herein are non-exclusive; accordingly, a process, method, article or device that includes a list of elements may include not only these elements, but also other elements that are not explicitly listed or are not part of said process, method, article or device. In addition, the term "coupling" and any other variations thereof as used herein may refer to physical, electrical, magnetic, optical, communication, functional, and/or any other connection.

Those skilled in the art will realize that many changes can be made to the details of the above embodiments without departing from the basic principles of the present disclosure. The scope of the present disclosure shall therefore be determined in accordance with the following claims.

What is claimed is:

1. An ultrasonic imaging method, comprising:
   obtaining an imaging setting for current ultrasonic imaging, the imaging setting comprising at least a type of a biological tissue under examination;
   determining a first beam forming procedure corresponding to the imaging setting from a plurality of predetermined beam forming procedures according to predetermined relationships between different imaging settings and the plurality of predetermined beam forming procedures, wherein the plurality of predetermined beam forming procedures comprise at least a minimum variance beam forming procedure and a coherent factor beam forming procedure;
   controlling an ultrasonic probe to transmit ultrasonic waves to the biological tissue under examination according to the imaging setting and obtain echo signals from the biological tissue under examination;
   beam-forming the echo signals by the determined first beam forming procedure to generate first beam-formed data; and
   generating an ultrasonic image of the biological tissue under examination based on the first beam-formed data,
   wherein the determining a first beam forming procedure corresponding to the imaging setting from a plurality of predetermined beam forming procedures according to predetermined relationships between different imaging settings and the plurality of predetermined beam forming procedures, comprises:
   determining the minimum variance beam forming procedure as the first beam forming procedure in response to a determination that the type of the biological tissue under examination is a nerve; and
   determining the coherent factor beam forming procedure as the first beam forming procedure in response to a determination that the type of the biological tissue under examination is a heart, muscle, or bone.

2. The method according to claim 1, wherein the plurality of predetermined beam forming procedures further comprise at least one of a delay and sum beam forming procedure, an incoherent beam forming procedure, and a frequency domain beam forming procedure.

3. The method according to claim 1, wherein the obtaining the imaging setting for the current ultrasonic imaging comprises: determining the imaging setting for the current ultrasonic imaging based on a received user input.

4. The method according to claim 1, further comprising:
   obtaining an adjusted imaging setting for the current ultrasonic imaging;
   determining a second beam forming procedure corresponding to the adjusted imaging setting from the plurality of predetermined beam forming procedures according to the predetermined relationships between different imaging settings and the plurality of predetermined beam forming procedures;
   controlling the ultrasonic probe to transmit second ultrasonic waves to the biological tissue under examination based on the adjusted imaging setting and obtain second echo signals from the biological tissue under examination;
   beam-forming the second echo signals by the determined second beam forming procedure corresponding to the adjusted imaging setting to generate second beam-formed data; and
   generating a second ultrasonic image of the biological tissue under examination based on the second beam-formed data.

5. The method according to claim 1, further comprising:
   obtaining an adjusted imaging setting for the current ultrasonic imaging; and
   determining whether the adjusted imaging setting meets a first predetermined condition, and switching the first beam forming procedure to a second beam forming procedure corresponding to the adjusted imaging setting when the adjusted imaging setting meets the first predetermined condition.

6. The method according to claim 1, further comprising:
   obtaining an adjusted imaging setting for the current ultrasonic imaging; and
   determining whether the adjusted imaging setting meets a second predetermined condition, and maintaining the first beam forming procedure unchanged when the adjusted imaging setting meets the second predetermined condition.

7. The method according to claim 5, wherein the first predetermined condition comprises: a change value of the adjusted imaging setting relative to the imaging setting being greater than a predetermined threshold.

8. The method according to claim 6, wherein the second predetermined condition comprises: the adjusted imaging setting being a predetermined type of imaging setting.

9. An ultrasonic imaging method, comprising:
   controlling an ultrasonic probe to transmit a first transmitting ultrasonic wave to a biological tissue under examination based on an imaging setting for current ultrasonic imaging and obtain first echo signals from the biological tissue under examination, wherein the imaging setting comprises a type of the biological tissue under examination;
   beam-forming the first echo signals with a first beam forming procedure corresponding to the imaging setting according to predetermined relationships between different imaging settings and a plurality of predetermined beam forming procedures, wherein the plurality of predetermined beam forming procedures comprise at least a minimum variance beam forming procedure and a coherent factor beam forming procedure, and wherein the minimum variance beam forming procedure is determined as the first beam forming procedure in response to a determination that the type of the biological tissue under examination is a nerve, and the coherent factor beam forming procedure is determined as the first beam forming procedure in response to a determination that the type of the biological tissue under examination is a heart, muscle, or bone;

generating a first ultrasonic image of the biological tissue under examination based on beam-formed data obtained by the first beam forming procedure;

obtaining an adjusted imaging setting for current ultrasonic imaging;

determining a second beam forming procedure corresponding to the adjusted imaging setting from the plurality of predetermined beam forming procedures based on the predetermined relationships between different imaging settings and the plurality of predetermined beam forming procedures;

controlling the ultrasonic probe to transmit a second ultrasonic wave to the biological tissue under examination based on the adjusted imaging setting and obtain second echo signals from the biological tissue under examination;

beam-forming the second echo signals by the determined second beam forming procedure; and generating a second ultrasonic image of the biological tissue under examination based on beam-formed data obtained by the second beam forming procedure.

10. The method according to claim 9, wherein the imaging setting further comprises at least one of an ultrasonic probe type, a probe scan mode, and an imaging parameter for ultrasonic imaging.

* * * * *